United States Patent [19]

Tanaka

[11] Patent Number: 4,945,219
[45] Date of Patent: Jul. 31, 1990

[54] COMPOSITE CALLING CARD FOR SOCIAL AND BUSINESS DATA AND USE

[76] Inventor: Masaki Tanaka, 10 Sarah Dr., Farmingdale, N.Y. 11735

[21] Appl. No.: 388,300

[22] Filed: Jul. 27, 1989

Related U.S. Application Data

[63] Continuation of Ser. No. 80,884, Aug. 3, 1987, abandoned.

[51] Int. Cl.⁵ .................................................. G06K 19/02
[52] U.S. Cl. .................................... 235/488; 235/487
[58] Field of Search ............... 235/379, 380, 384, 454, 235/487, 488, 491

[56] References Cited

U.S. PATENT DOCUMENTS

| | | | |
|---|---|---|---|
| 3,958,103 | 5/1976 | Oka | 235/384 |
| 3,959,630 | 5/1976 | Hogberg | 235/491 |
| 4,249,163 | 2/1981 | Maurer | 235/379 |
| 4,288,688 | 9/1981 | Kiyama | 235/384 |
| 4,464,566 | 8/1984 | Silverman | 235/454 |
| 4,527,051 | 7/1985 | Stenzel | 235/380 |
| 4,680,459 | 7/1987 | Drexler | 235/454 |
| 4,725,719 | 2/1988 | Oncken | 235/487 |

*Primary Examiner*—Harold I. Pitts
*Attorney, Agent, or Firm*—Stephen E. Feldman

[57] ABSTRACT

A calling card is printed on its paper front side with data for visual presentation. The card back side is made from a material that will accept, retain and permit the reading of encoded data by a card reading device. Data decoded by the card reader is visually displayed on a cathode ray tube and stored in a data storage device for later retrieval.

4 Claims, 1 Drawing Sheet

COMPOSITE CALLING CARD FOR SOCIAL AND BUSINESS DATA AND USE

This application is a continuation of application Ser. No. 080,884, filed 8/3/87, now abandoned.

BACKGROUND OF THE INVENTION

1. Field of the Invention

The present invention relates to the field of data or information storage and retrieval. More particularly the present invention relates to a novel business or calling card, which, while having the outward appearance of a normal business card, is a source of data storage which serves not only as an introduction of one business individual to another but is in fact a highly transportable source of company information extended from one company to another company in furtherance of a business relationship between the two companies. The business or calling card includes a capability of storing encoded data thereon which may be read and decoded by an appropriate card reading device. The card reading device may be interfaced with a terminal having a monitor or cathode ray tube (CRT) which provides a visual readout of the decoded data for immediate use, for example and may include a data storage device for storing the data in an appropriate file or storage medium for later retrieve and/or use.

2. Prior Art

The use of business or calling cards in the intercourse of business is well established. Business cards and personal cards are printed in the countless numbers annually and are passed freely between people for business purposes and socially. Generically referred to as business cards, these cards generally include rather limited information on them. From the aspect of social use the limited information on the card such as name, address and telephone number is normally adequate but from the aspect of business it is often desired to place more information on the card than dictated by space and good taste.

In business it is usual to exhibit the name of the individual presenting the card along with the name of the company or other entity represented by such individual. Also appropriate is the address and telephone number of the company or where the individual named can be reached. It is a further business custom to include a title of the person presenting the card. Some cards also include a company logo and, in some instances, key words or phrases normally relating in some way to either the company represented by the individual or relating in some way to the individual himself. It is not unusual that an individual represents several companies too numerous to be listed on the limited space of business cards. There are occasions when an individual is associated with a particular company but the individual would prefer to limit the knowledge of such association from casual inspection. This requires that the person have two different cards.

A particular function of a business card is for purposes of recall. A person having a business card will very often present his card for purposes of introduction but intends that the receipant of the card retain the card for future reference, if and when a need should arise. A file of business cards is a convenient and efficient way of keeping a recall file, that is, the card is an objective reference to a particular individual. This method or system of recall is often beneficial to both the card donor and the card receipant. Thus, for this and other reasons, the normal business and/or calling card is made to be disposable yet not casually destructable.

Plastic credit, bank and/or identification cards have found wide spread use in commerce. The plastic card is a substantially non-destructable card, in that although it may be destroyed, the card normally takes substantial abuse. The plastic card also serves to support an encoding material or support a substrate such as a tape which is encodable, normally by magnetic means, with identifying data. The plastic card is not considered disposable in that the plastic card is used, retrieved and used again. Technology includes a card reader through which the plastic card is passed and the card reader reads the encoded data on the card. The data may include an identification number or other information encoded on to the card.

SUMMARY OF THE INVENTION

The present invention provides a novel business and/or calling card for use in routine business-to-business contact in which the business card, made in disposable card form, holds or retains a substrate which may be encoded with data. The substrate may be in the form of one or more encodable stripes on which normally transmitted business data or information, in a condensed, consolidated and predetermined form is set forth. The data may be encoded on to the encoding stripe or stripes using current technology such as magnetic encoding or by other means. The data enclosed on the card may be a company portfolio in clear, condensed and positive form setting forth the company catalog clearly and concisely as established by the company. The encoding of such information on a business card lays out the data according to company protocal without diverting from a company established norm, or standard, without personality interference. The business card, encoded with such highly selected data maybe fed through a card reader which interfaces with word processing and/or data bank systems in use in industry. The information on the card may be added to the data base of the system, for future reference, and may therefor serve as a conductor of marketing data and a medium for marketing communication.

In addition to carrying selective data encoded on the card, the business card retains its character of a medium of personal introduction and recall. The card maybe presented to a company receptionist, for example who will not only run the card through a card reader but forward the card to the person who is to meet with the person who presented the card.

It is therefore an object of the present invention to provide a business and/or calling card which has integrated therein data storing capability.

Another object is to provide a business and/or calling card on which data may be encoded which is readable by a card reader.

Still a further object is to provide a system in which data is encoded on a magnetic strip integrated into a disposable business card and is read by a card reader, stored in a data base storage and visually displayed on a CRT for instant review.

A still further object is to provide a business card that includes the capability of being encoded with data in stripes of data that are readable by a card reader.

These and other objects will become apparent when reading the following detailed description of the inven-

DETAILED DESCRIPTION OF THE INVENTION

Figure 1:
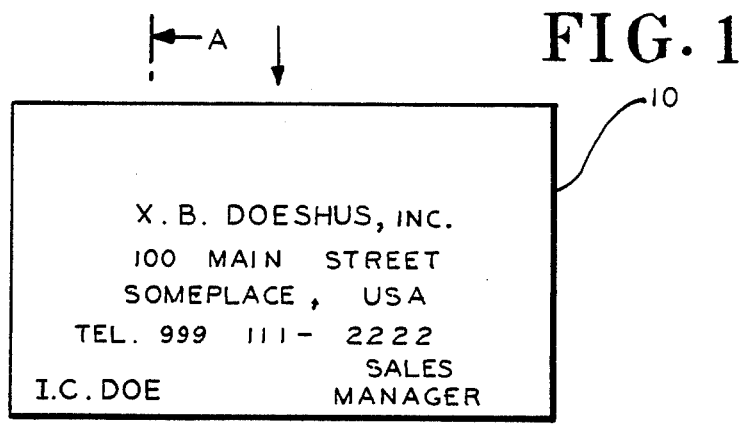
FIG. 1 illustrates the front of a business or calling card.

FIG. 1 illustrates the front of a business card 10, imprinted with the name of the company, the name of the representative, the title of the representative and the address and telephone number of the company.

Figure 2A:
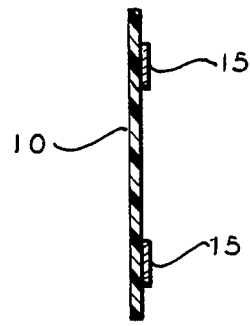
FIG. 2a is a cross section view of the business card of FIGS. 1 and 2 along line A—A.
Figure 2:
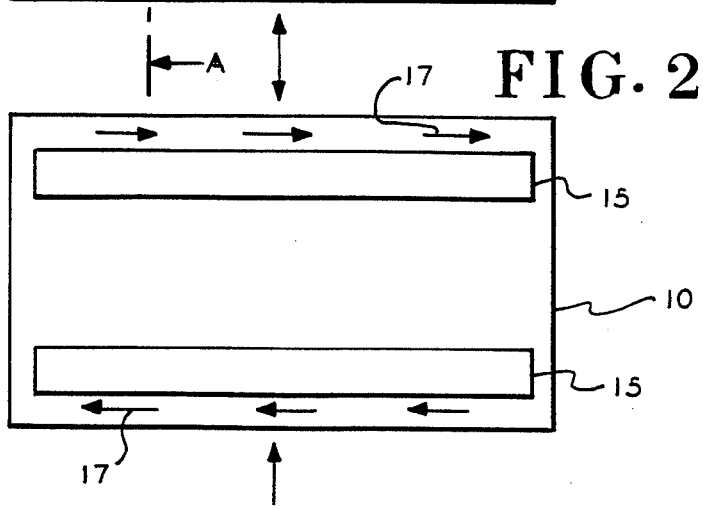
FIG. 2 represents the back of the business card practicing one embodiment of the invention.

FIG. 2 represents the back of the card 10 which includes stripes 15. The stripes 15 encodable and secured to the body of the card 10 in any way that does not adversily effect the characteristics of the stripes 15. The card 10 may be a hard, durable paper material or some other material to which the stripes may be secured or adhered.

The stripes 15 may be a tape on which data may be encoded by magnetic means, for example.

Figure 4:
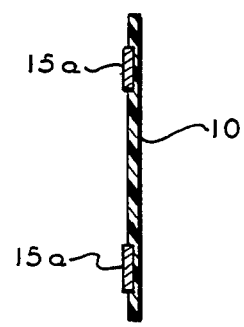
FIG. 4 is an alternate structure of the business card of the present invention.

FIG. 2a is a cross sectional view of the business card of FIGS. 1 and 2 showing the card 10 and stripes 15 secured to the back of the card. FIG. 4 represents an alternate structure where the stripes 15a are partially imbedded in the card 10. In another version, the stripes for encoding may be completely embedded in the card so long as the material of the card does not adversely effect the capability of the stripe to be encoded and have the encoded data read out of the stripe.

In a still further alternate structure, a business card may be a lamination of a paper material, for example, which serves as the face of the business card, for printing information thereon, and an encodable material bonded to the paper material for holding or storing additional data, for example, by magnetic encoding.

Figure 3:
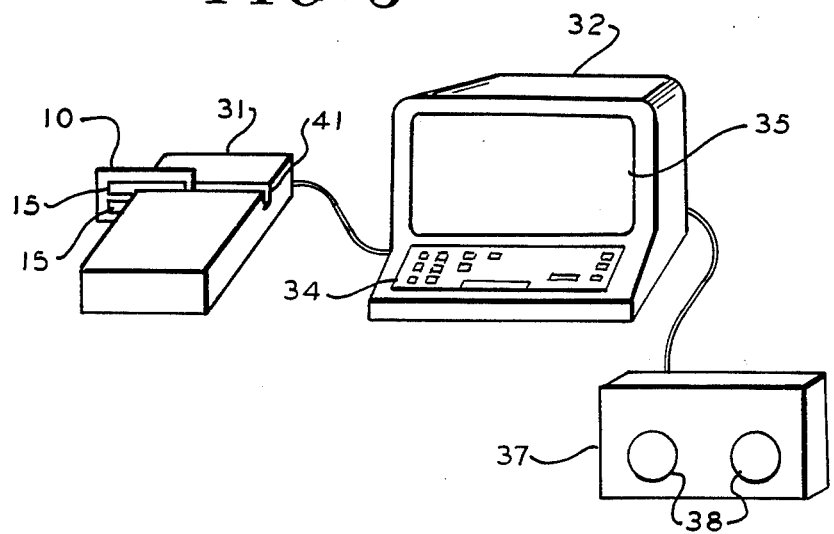
FIG. 3 is a representation of a data retrieval and storage system with card reading.

FIG. 3 represents the card reading system which includes a card reader 31 coupled to a terminal 32 which includes a keyboard 34 and cathode ray tube (CRT) 35. A tape recorder 37 represents a data storage apparatus with tape reels or a cassett represented by circles 38.

In reading the card 10, the card is passed through a channel 41 in the reader 31. Reading heads (not shown) in the card reader will detect and read the encoding on the stripe 15 which is completely set into the channel. The arrows 17 on the back of the business card 10 indicates the direction the card should be passed through the card reader for that particular strip.

The encoded data is converted into intelligent words and the words are displayed on the CRT 35 for immediate viewing. The data is also applied to a data storage apparatus 37 which stores the data on storage tapes for example represented at 38. The data storage apparatus 37 may be any other type of data storage capable of storing data decoded by the card reader, such as a disk or other memory means, for example. An address for the data may be provided by operating the keyboard 34. Thus data stored on the card may be read and decoded, displayed on a screen for immediate viewing and stored in a data storage device with an address so that the stored data is easily retrievable. The system may also include a printer (not shown) so that a written or printed copy i e, hard copy of the data on the business card may be made.

The card may then be retained by the receipant, if desired.

It is also within the scope of the invention that a business card may be a composite material card. The card may be composed of at least two materials, one material on which printing may be done, the printable side serving as the face of the card. The other side may be of an encodable material, serving as the back of the card, on which data may be encoded in a form that is readable or retrivable. A further material that may be used for the card is an encodable material that may be printed upon, on one side and encoded on the other or both sides.

The invention has been described in its preferred embodiment and the system in which the invention may be used has also been described. Alternate forms of the business card have been shown and described and other forms have been suggested other changes and modifications may be made, as will become apparent to those skilled in the art, without departing from the invention as defined in the appended claims.

What is claimed is:

1. A system for communicating information from one entity to another entity, said system comprising:
   (a) a card reading means for reading and decoding encoded data on a calling card passed through said card reading means;
   (b) a terminal coupled to said card reading means for receiving decoded data from said card reading means and for visually displaying said decoded data for visual presentation and for storing said decoded data for subsequent retrieval and display, said terminal including a cathode ray tube for visually displaying decoded data thereon and data storage and retrieval means for storing said decoded data and for retrieving said decoded data; and,
   (c) said calling card having a front side and a back side bonded together forming a composite material calling card in disposible not destructible form, said front side being a paper material for accepting and retaining visible printed data thereon, said visible printed data being freely readable and defining social and/or business introduction information personal to an individual, said back side being an encodable material for accepting and retaining a virtually invisible encoded data defining business information, said encoded data being readable by said card reading means when said calling card is passed through said card reading means, said business information including business data, marketing data and marketing communications.

2. A system for communicating information as in claim 12 and in which said back side of said calling card includes a stripe of encodable material for storing data thereon, said data on said stripe being in a coded form and readable and decodable by said card reading means.

3. A calling card for providing social and/or business introduction of an individual in visual display on one side thereof and for providing business information in virtually invisible display on the other side thereof, said calling card comprising:

(a) a face side and a back side bonded together for forming a composite material calling card in disposible yet not casually destructible form;

(b) said face side being a paper material for accepting and retaining a visible first data, said first data visibly displayed on said face side in freely readable form and defining social and/or business introduction information personal to an individual; and (c) said back side being an encodable material for accepting and retaining a virtually invisible second data, said second data virtually invisibly displayed on said back side in encoded form, readable by a card reader, said second data defining business information related to the individual introduced by said first data.

4. A calling card as in claim 3 and in which said visible first data is printing visually displayed on said face side.

* * * * *